United States Patent [19]
Colwill et al.

[11] 3,794,228
[45] Feb. 26, 1974

[54] BURSTING AND SEPARATING APPARATUS FOR CONTINUOUS FORMS

[75] Inventors: Richard H. Colwill, Victor; William E. Dewey, Pittsford; Hans Lochmann Vanbennekom, Rochester; William H. Mowry, Jr., Ionia, all of N.Y.

[73] Assignee: Burroughs Corporation, Detroit, Mich.

[22] Filed: Dec. 22, 1971

[21] Appl. No.: 210,737

[52] U.S. Cl. .................. 225/93, 225/101, 225/105
[51] Int. Cl. ....................... B26f 3/02, B65h 35/10
[58] Field of Search ...... 225/101, 100, 106, 105, 93

[56] References Cited
UNITED STATES PATENTS

| | | | |
|---|---|---|---|
| 2,618,336 | 11/1952 | Davidson | 225/100 X |
| 2,742,087 | 4/1956 | Smith et al. | 225/101 |
| 3,133,684 | 5/1964 | Wiltshire et al. | 225/101 |
| 838,930 | 12/1906 | Abel | 225/105 |
| 2,355,690 | 8/1944 | Zent | 225/100 |
| 2,370,465 | 2/1945 | Higby | 225/105 X |

FOREIGN PATENTS OR APPLICATIONS

423,443  4/1967  Switzerland......................... 225/101

Primary Examiner—Frank T. Yost
Attorney, Agent, or Firm—Carl Fissell, Jr.

[57] ABSTRACT

Apparatus for automatically, continuously bursting and separating individual items at relatively high speed from a continuous series of items such, for example, as manifolded document forms. The invention employs one or more oppositely disposed, substantially rigid, yet deformable members disposed in confronting arrangement in the path of the items to be separated. The deformable members are movable into face contact with the items disposed therebetween so that the items are stretched tautly between the confronting deformable members causing the leading item to be burst apart and separated from the adjoining trailing items. Means adjacent to the deformable members and in the pathway of the items cause the burst item to be rapidly discharged out of the path of the advancing items and into a stacking pocket or hopper or onto a shingling table.

17 Claims, 14 Drawing Figures

BURSTING AND SEPARATING APPARATUS FOR CONTINUOUS FORMS

BACKGROUND OF THE INVENTION

Modern business methods and procedures, in order to provide a more efficient and rapid method and means for handling individual printed items, utilize so-called continuous forms. The continuous form is variously defined but, for example, may be a series of items which are separated by lines of weakening, such as perforations; and generally the forms are provided with advancing and guiding means usually in the form of parallel rows of sprocket holes engageable with the vertically projecting pins of a pin feed tractor, for example.

Such items may also be produced in a continuous, nonperforated form; fan-folded back and forth; or may be rolled items or sheets. Such items are then divided into individual item sheets or documents by means of a cutter penetrator mechanism.

Usually, and for the most part, the known bursting devices employ pairs of rollers operable in surface contact and disposed in the pathway of the advancing items. Such rollers are generally arranged in separated sets or pairs in such manner that the speed differential between sets or pairs and the fact that the item is gripped between one pair or set causes the items to become stretched therebetween. A stress raising element, e.g., breaker bar is projected into the weakened area of the item, causing the individual item to be stripped or burst apart from the continuous series of forms.

While all such bursting devices operate reasonably satisfactorily, there is a noticeable high degree of noise involved. Also, accuracy of control of separation may be relatively difficult to obtain and maintain because of the lack of positive and precise contact engagement of the rollers with the document to be burst. All of such devices are characteristically weighty, suffer from noticeably high inertia problems due to the large moving masses and the speeds involved. Additionally, such apparatus requires supervision and interplay between operator and machine if the form size varies since in many cases the position of or distance between the bursting rollers must be altered to accommodate the change in the form size or length.

Many prior art bursting devices suffer from one or more of the following problems in varying degrees of severity: bending, wrinkling or spindling of the items due mainly to the items entering the bight of the bursting rollers in the wrong manner; irregular bursting or ripping of the items on an area other than along the preweakened perforations; puncture type damage due in large measure to the type of penetrator employed; blurring of carbon image on multiply items due to excessive pressure build-up between "snap" or bursting rollers.

Many prior art burster constructions require some sort of cutter bar, blade, wheel, roller or other severing mechanism in addition to the hold and feed rollers in order to separate or burst the forms or items apart. Such equipment is costly to tool up and maintain, is noisy, and must be renewed at periodic intervals due to wear and lubrication requirements.

Such prior art bursters as are generally available must be able to accommodate many size document lengths and widths necessitating operator intervention to change rollers, belts or pulleys, etc. Also, because all such known devices utilize sets or pairs of rollers operating at different relative speeds to hold and burst the form apart, the apparatus tends to become excessively large or long or both and thus requires an undue amount of space which oftentimes cannot be conveniently provided in modern offices, laboratories, etc.

The present invention contemplates, but is obviously not limited to, the use of documents varying in length from 2 5/6 inches to 24 inches and in width between 6 inches and 20 inches. The paper or item thickness can vary from single ply item onion skin or thinner paper to as many as eight or more ply multipart forms.

So as to enable the present invention to be utilized with other and different cooperating devices such as check or item signers, check protectors, decollators, stackers, slitters, etc., the apparatus is constructed in a modular format. The main operational elements of the combination are demountably housed within and operably associated with a base supporting structure enabling efficient, quick, and easy maintenance and avoiding the requirement for highly skilled on-site operator service personnel.

SUMMARY OF THE INVENTION

The present invention overcomes the difficulties of the prior art and provides a neater, cleaner, quiter, smaller and much more efficiently operating bursting-separating apparatus by utilizing a novel and heretofore unknown combination of elements which enable the apparatus to accommodate itself to varying sizes and plies or thicknesses of documents without the need for operator intervention to change or alter the arrangement of the basic bursting mechanism itself.

In accordance with the invention, there is provided upper fixed and a lower movable deformable members. These members are constructed so as to provide opposite, confronting, facing surfaces and are arranged to straddle a web of continuous item forms, e.g., checks which may be fed longitudinally through the apparatus from a supply bin or roll, etc.

The two members are adapted to be brought into surface contact with the web therebetween and (by means of suitable timing devices) into contact with the line of weakening, e.g., perforations approximately centrally located relative to the transverse dimension of the two deformable members. As the two members contact the web, they grip the continuous form item or item stack, as the case may be, tightly therebetween. Continued movement of the two members towards each other causes the adjacent items to be stretched apart at the line of weakening, effectively bursting the leading item from the next or trailing item. Thereafter the burst item or items are moved at high speed out of the bursting area onto a shingling table or into a stacking hopper as desired.

In another embodiment of the invention the upper and lower deformable members are first caused to move toward one another so as to grip the item or items therebetween after which, as the items are spread apart at the line of weakening, a penetrator assembly is caused to be projected into engagement with the items at the line of weakening, effectively bursting the leading and trailing items from one another.

In still another embodiment of the invention the two deformable members are caused to be brought into engagement with one another at a slight but predetermined or known angle so that one edge of the upper and lower members meet at the line of weakening between items before the remaining portion of the deformable members meet, thus causing the items first to be clamped together and then burst and separated starting at one edge portion. Thereafter continued movement of the deformable members toward one another causes the line of bursting to travel transversely across the line of weakening in the item, effectively severing and separating the leading from the trailing items.

In a still further embodiment of the invention the two deformable members, hereinafter referred to as hold feet simply to characterize their functional operation without limiting the inventive concept, may be molded into substantially a T-shaped cross-sectional configuration. The members are adapted to span the transverse or width dimension of the apparatus and can, for example, be of polyurethane or synthetic rubber, etc., having inherently high resistance to abrasion and not being too readily deformed or resilient, e.g., in a range of from 40 to 90 durometer (Shore A Scale). A central triangularly shaped weight relieving cutout extends transversely the length of each member and provides a web portion at the cross bar of the T-formation thereof which acts to prevent jamming of the paper items. The hold feet members could of course be of solid construction providing a suitable shape or configuration for causing the clamping and separating action heretofore described is utilized.

The upper hold foot is arranged within a rigid support member extending from side to side of the burster apparatus; while the lower hold foot member, having in one embodiment a longitudinally extending, substantially rectangular cutout portion thereon, is disposed in a transverse, vertically, reciprocably movable member. The lower portion of this latter member includes means engageable a driving mechanism such as pairs of actuating cams or eccentric members, the latter being disposed on opposite sides of the burster mechanism. Extending through the central aperture or cut out portion of the lower hold foot is a vertically, reciprocably movable, bar-like member, hereinafter referred to as a penetrator. By means of oppositely disposed cams or eccentrics, located between the bursting can mechanism on each side of the burster apparatus, the penetrator member is caused to be projected vertically, upwardly into contact with the web of the lower hold foot member. Continued movement of the cams causes the penetrator to move the lower hold foot into gripping and stretching engagement with the upper hold foot with the item disposed therebetween. As the cam continues its rotation, the penetrator is forced into the area of the line of weakening between adjacent items effectively exceeding the elastic limits of the weakened portion of the items and bursting the items apart.

BRIEF DESCRIPTION OF THE DRAWINGS

The invention, both as to its organization and method of operation, together with other and further advantages thereof, will be best understood by reference to the following detailed description taken in conjunction with the accompanying drawings, in which.

DETAILED DESCRIPTION OF THE INVENTION

Figure 1:
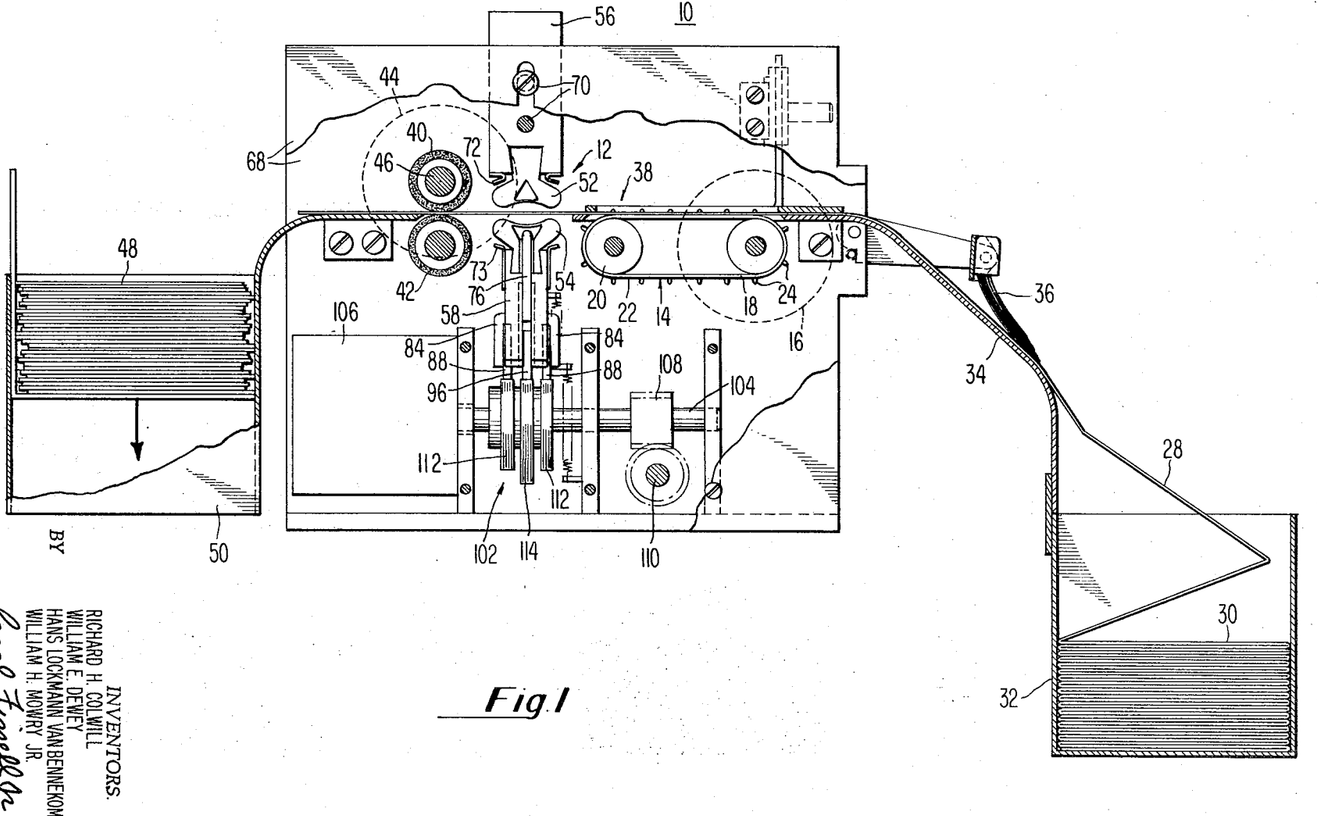
FIG. 1 is an idealized side elevational view of a burster apparatus embodying the present invention illustrating the general arrangement of the item pathway from supply bin to burst item receptacle.

Referring to FIG. 1 of the drawings, there is shown an idealized assembly view of a high speed continuous form item bursting apparatus 10. The burster 10 may be part of a modularized signer-protector-burster apparatus, which apparatus is designed to include a number of features not herein described in detail but which enable the apparatus to perform other and additional functions to that of paper separating and bursting as set forth in more detail and particularity in copending United States Patent Application Ser. No. 249,341. A bursting mechanism 12 as hereinafter described in detail is or may be disposed centrally of the main machine assembly 10, as shown. An item moving device such as a pin feed tractor mechanism 14 is driven by electric motor 16 through a belt 18 and pin wheel pulleys 20. The pin feed tractor includes a movable pin mechanism 22 provided with projecting conically shaped pins 24. Pins 24 are engageable with line holes or perforations 26 located on opposite, parallel edges of continuous item forms 28 as seen more clearly in FIG. 2. Item forms 28 are generally, although not necessarily, manifolded as shown at 30, FIG. 1, and may be fed vertically, upwardly from supply bin 32 by the pins of feed tractor 14. In the present arrangement, as a result of the novel construction to be described presently, items varying in width from 2 5/6 inches to 24 inches may be accommodated without alteration of the bursting mechanism 12.

Figure 2:
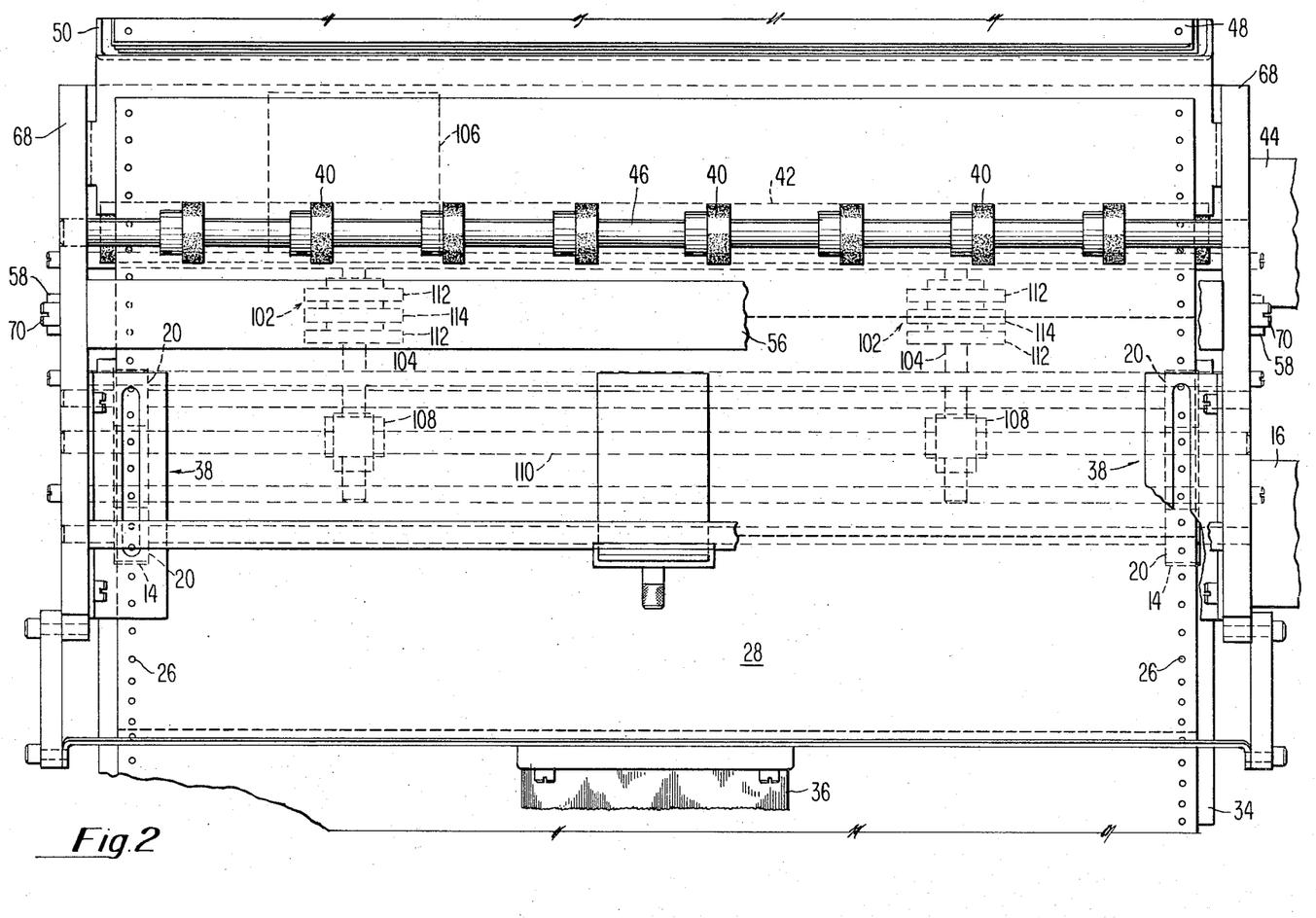
FIG. 2 is a top plan view of the burster apparatus of FIG. 1 showing the continuous form items in conjunction with the item moving and stacking means.

As seen in FIG. 1 of the drawing, the continuous forms 28 are adapted to be fed slantingly, vertically, upwardly over smoothing and retarding means such as the arcuately curved guiding member 34 under a smoothing brush assembly 36 into feed area 38. Individual pin feed tractors 14 are arranged on opposite sides of the apparatus, and each tractor is adapted for horizontal, slidable movement toward and away from the other such mechanism along a helically threaded member (not shown), permitting the tractors 14 to be operator-adjusted for varying documents or item width. The continuous form item 28 is then fed by the tractors 14 into the bursting mechanism 12, to be described in detail shortly, and therebeyond into the bight of upper and lower ejection rollers 40 and 42, respectively. Ejection roller 42 as seen in FIG. 2 is in this embodiment of the invention a single, rubber tired, continuously rotatable high speed roller extending across the width of the apparatus and rotatable by means of motor 44. Rollers 40, having resilient peripheral portions, are spring biased so as to be engageable with the continuously rotating surface of roller 42 and are disposed along shaft 46. The individually burst item hereinafter identified at 48 once separated from the continuous form 28 is moved at high speed leftwardly in FIG. 1 into a stacker hopper 50 where such items are stacked one on top of the other for further handling and processing.

The burster mechanism 12, as seen in detail in FIGS. 5 through 8 inclusive, comprises oppositely disposed, substantially identically shaped upper and lower elongated transversely disposed hold foot members 52 and 54. In cross section these two members in this embodiment are shaped roughly in the form of an enlarged "T". The opposite ends of the cross bar of the T being dumbbell shaped as at 52a and 54a, respectively. These members are or may be moded from an elastomer or polyurethane but in any case are relatively rigid yet deformable under pressure. The material should be resistant to solvents and sunlight, air and moisture and should be relatively inexpensive. The material also should exhibit a high degree of abrasion resistance for the use being described. Each hold foot member is provided with a weight relieving, central, triangularly shaped, cut out portion 52b and 54b extending longitudinally therethrough from end to end thereof. As earlier mentioned herein, these hold feet could be constructed of solid material throughout so long as each member exhibits an ability hereinafter described in detail to clamp and spread or stretch the paper item disposed therebetween for purposes of bursting as described. The base of such triangular portion 52b and 54b provides an integrally disposed web portion 52c and 54c extending between the dumbbell shaped opposite ends 52a and 54a, respectively. The members 52 and 54 are adapted to be received within supporting foot rail members 56 and 58 and to this end are provided with wedge-shaped, vertical holding portions 60 and 62, respectively, receivable in correspondingly shaped channels 64 and 66 in the upper and lower foot rail assemblies.

The upper foot rail member 56 is secured at opposite sides of the main frame 68 of the burster assembly by means of screws or bolts 70 as seen in FIGS. 1 through 10, inclusive, of the drawings. Oppositely disposed shoulder bumpers or stops 72 are mounted in conventional manner to the lower depending portion of the upper foot rail assembly for purposes to be described presently. Similarly, stops 73 are secured to the lower foot rail members as will be described later on herein.

The upper hold foot 52 may be press fitted into the wedge-shaped aperture 64 and/or it may be held by adhesive or bolts as desired.

Figures 5, 6, 7, 8:
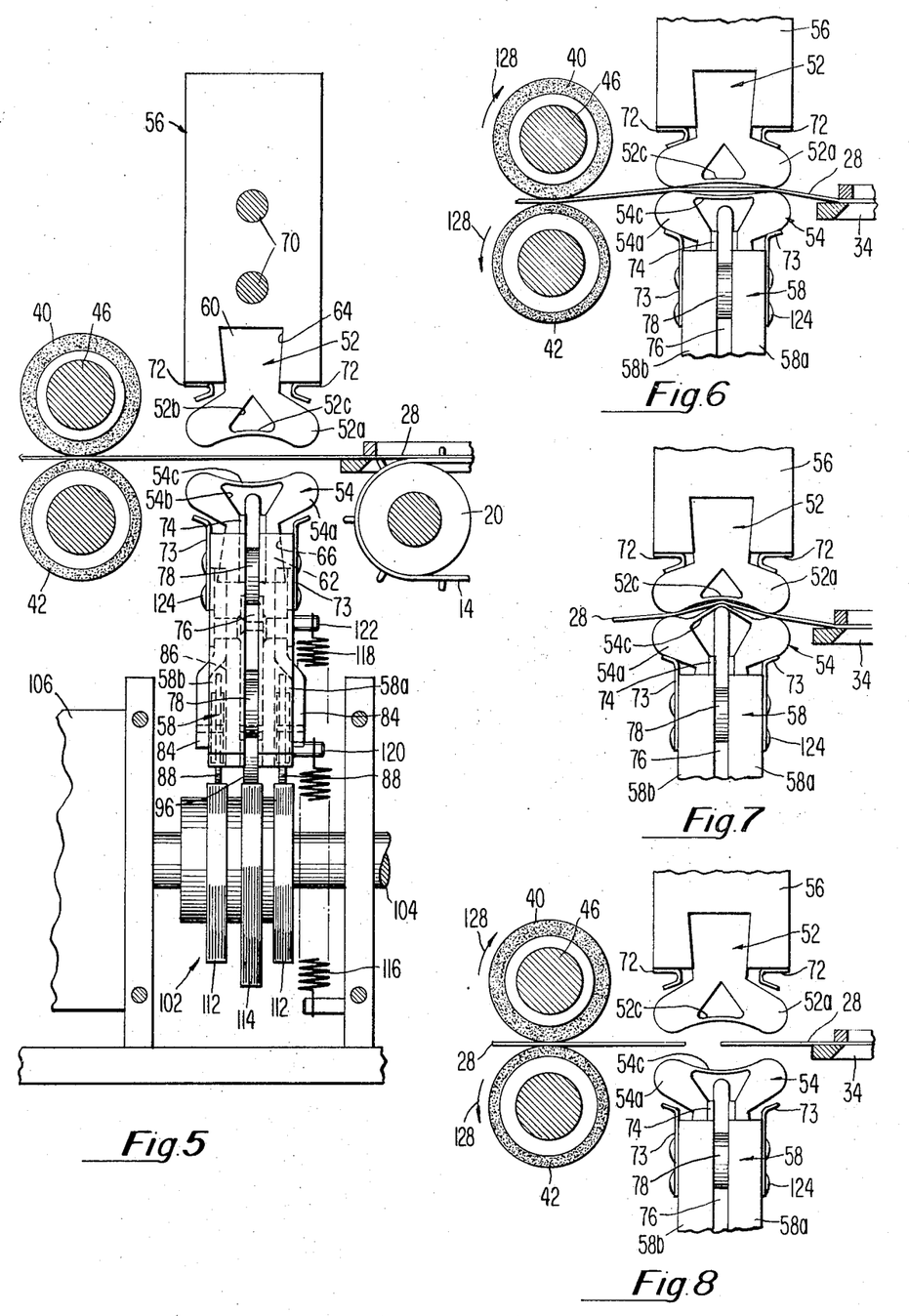
FIG. 5 is a detailed close-up view of the bursting and drive mechanism of the invention and illustrating a portion of the tractor feed and the item stacking roller arrangement.
FIGS. 6 through 8 inclusive are detail views of the operational sequence of the burster apparatus illustrating three different actions thereof viz; clamping FIG. 6; penetrating FIG. 7 and bursting and separating.

As seen more clearly in FIG. 5, the lower hold foot member 54 is provided with a substantially rectangular central cut out or aperture 74 extending from the apex of the triangular opening 54b to the lower extremity of the wedge-shaped portion 62. A vertically, slidably movable member 76 characterized as a penetrator due to its function herein, is reciprocably receivable within the aperture 74 for purposes to be explained in detail later on.

The lower foot rail member 58 comprises a pair of oppositely disposed, parallel, substantially identical rigid members 58a and 58b extending transversely across the width of the burster assembly as seen in FIGS. 3, 4, 9, and 10. Upper and lower separator members 78 provide an open transverse channel between the lower foot rail members for slidable, vertical travel of the penetrator member 76 enabling the latter to be projected upwardly into the triangular area of the hold foot member 54 as will be presently described.

Figure 9:
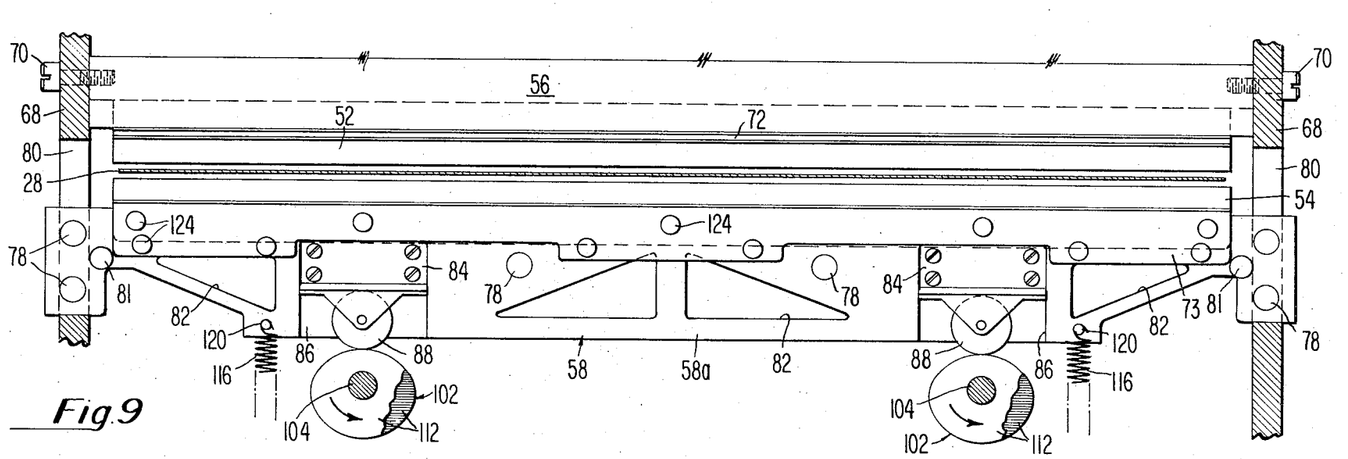
FIG. 9 is an elevational view similar to FIGS. 3 and 4 but illustrating a further embodiment of the invention wherein only the upper and lower hold feet assemblies are utilized to burst the continuous form items.
Figure 10:
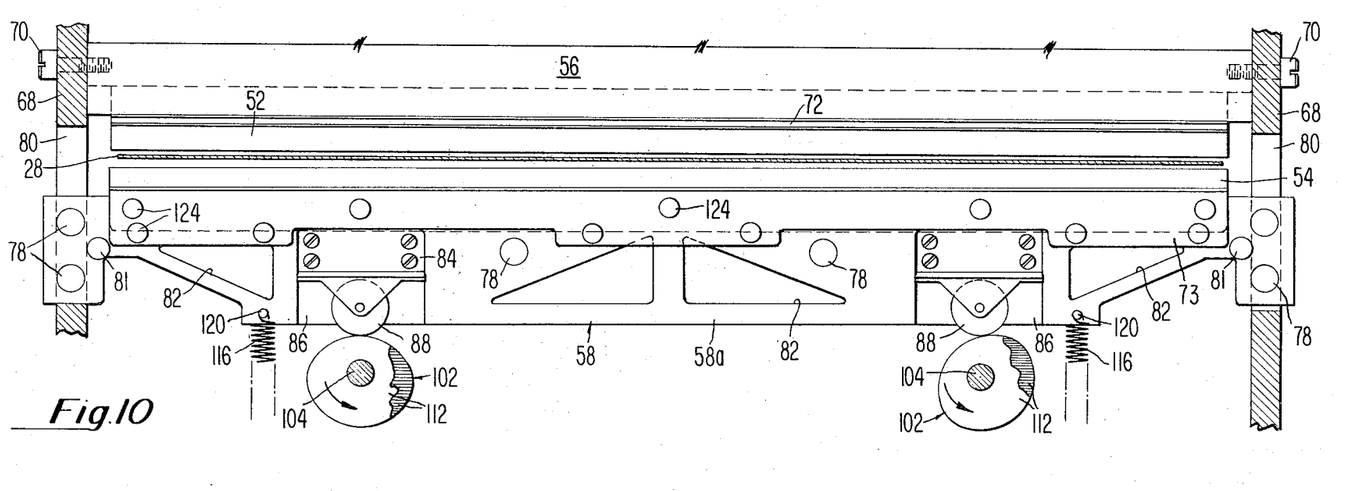
FIG. 10 is an elevational view similar to FIG. 9 illustrating a still further embodiment of the invention wherein the angular relationship between the upper and lower hold foot members is varied such that the bursting occurs first at one edge of the weakened portion and thereafter travels transversely across the item; and, FIGS. 11 through 14 inclusive illustrate in idealized and schematic form other and additional variations and modifications of the present inventive concept each of which is included within the purview of the accompanying claims.

The two foot rail members 58a and 58b, together with the penetrator member 76 as seen in FIGS. 3, 4, 9, and 10, form a transverse, elongate assembly which is arranged to extend from side to side of the base machine frame as shown. This assembly, as earlier indicated, is adapted to be vertically, slidably movable within the confines of the side frame 68 in confronting, vertical opening 80 therein. Guide wheels 81 constrain the assembly within the opening (FIGS. 9 and 10). This assembly is shown most clearly in FIG. 5 wherein it is depicted without the supporting side frames simply to provide an uncluttered view of the present novel combination.

Figure 3:
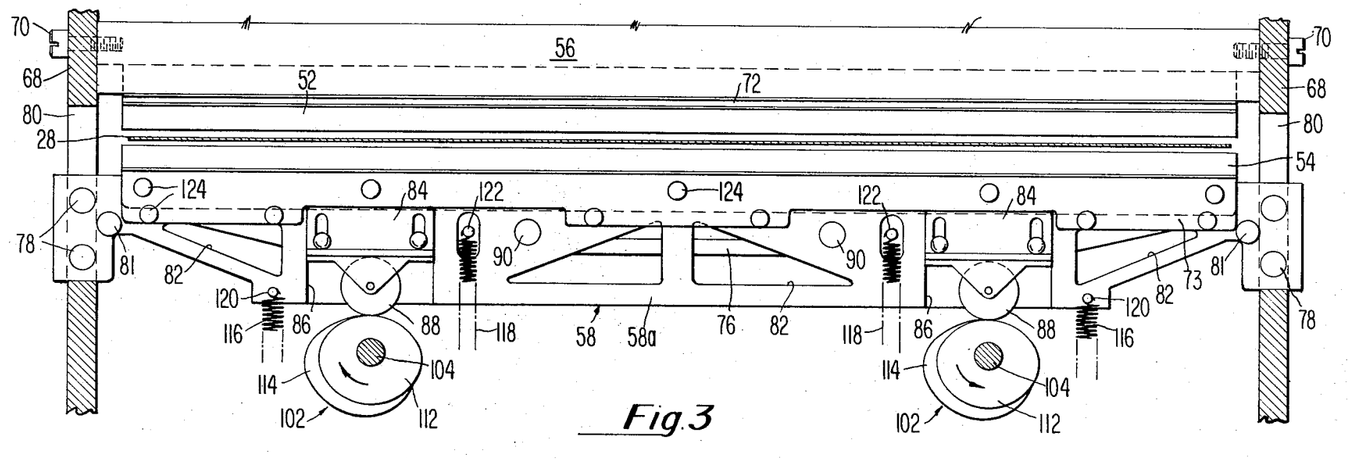
FIG. 3 is a rear elevational view of the bursting mechanism of the invention illustrating the arrangement of the upper and lower hold feet of the apparatus in operable association with the driving means therefor.

Foot rail members 58a and 58b are identically configured and, as will become apparent from FIGS. 3 and 9, are truss-shaped, self-supporting, rigid elements which include a number of weight-reducing cutouts 82 as shown tending to lower the overall mass of the assembly while maintaining relatively high rigidity thereof. The two rail members as earlier described are joined at their opposite ends by means of separator-spacer members 78. Each rail member is provided with a longitudinal channel 86 of such configuration that when the two rail members are joined together in parallel, spaced, confronting arrangement, FIGS. 1 through 5, the deformable hold foot member 54 with its central cutout 74 can be received and retained therebetween, e.g., as by means of adhesive, bolts and nuts, or by press fitting.

The two rail members each carry a pair of substantially identical depending follower members 84 located at opposite ends thereof and receivable in enlarged grooves 86 therein enabling the same to be vertically, slidably movable by means of follower rollers or wheels 88 rotatably secured to each follower member 84. Centered between the two rail members 58a and 58b is penetrator member 76, which latter member is vertically, slidably constrained on short, horizontally extending pins or posts 90, the latter projection between members 58a and 58b enabling the penetrator to be slidably movable on the pins via the slots 92 in the penetrator. Follower members 94 disposed at opposite ends of penetrator 76 each carry a follower roller 96 enabling the penetrator to be elevated and lowered for purposes to be described presently. The upper surface portion of the penetrator 76 is rounded as seen in FIGS.

Figure 4:
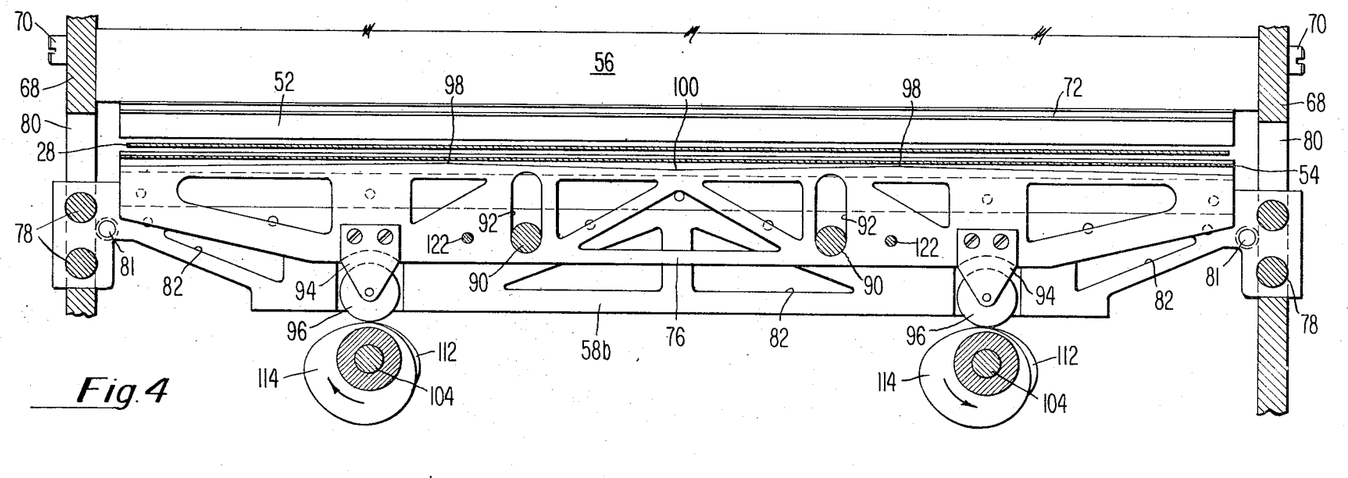
FIG. 4 is a view similar to FIG. 3 illustrating the penetrator mechanism for one embodiment of the invention and including the driving means operably associated therewith.

1 through 8 inclusive and, as shown in FIG. 4, has this surface configured to provide oppositely disposed high portions 98 separated by a central low portion 100 as will become more clear hereinafter.

Disposed below the foot rail and penetrator members and located on opposite sides of the main frame assembly are two individual cam clusters 102 carried by shafts 104, the latter being driven by motor 106 through gears 108 and shaft 110. Each cam cluster 102 includes three separate cams as seen most clearly in FIGS. 1 and 5 of the drawings. Cams 112L and 112R, the two outermost, oppositely disposed cams, are identical and each pair is adapted to engage its associated follower roller 88 of lower foot rail members 58a and 58b. Cam 114, the innermost of the three cams, is adapted to engage follower rollers 96 carried by penetrator member 76. It will be immediately apparent that rotation of the cams in the direction of the arrows in FIGS. 3 and 4 will cause the foot rail assembly and the penetrator to move vertically upwardly and downwardly in a precise, timed relationship as will be described shortly.

Both of the foot rail members as well as the penetrator member are biased in a downward direction by means of separate sets of springs 116 and 118, respectively, operably associated with fixed pins 120 and 122 carried respectively by the foot rail members and the penetrator as seen in FIG. 3. A box cam arrangement could also be utilized to provide this action. The opposite ends of the springs are attached similarly, as by pins, to the base of the main frame assembly, not shown.

As earlier described, both the upper foot rail member 56 and the lower movable foot rail assembly 58a and 58b are each provided with a restricting bumper or shoulder stop 72 and 73, respectively, attached as by bolts 124, only the bolts for the lower stop being shown in FIG. 5. These stop members limit the travel of the hold foot members as they contact one another in their travel into gripping engagement with the items to be burst and thus there is provided an automatic though adjustable limit upon the tension-pressure exerted upon the item at this line of weakening, i.e., perforations between items.

The operation of the inventive combination set forth herein will now be described with respect first to FIGS. 1 through 8, inclusive, of the drawings. Continuous forms 30, fan-folded as shown in FIG. 1, are fed out of the supply receptacle 32 slantingly, upwardly across the guide member 34 under smoothing brush 36 across the surface of the pin feed tractors into the feed area 38. The forms are adjusted with respect to the pin feed tractors 14 such that the line holes 26 located on opposite parallel edges of the forms engage the upstanding pins 24 of each tractor assembly. In this manner the forms are essentially centered with respect to the bursting mechanism, and the leading edge thereof is directed squarely into the bursting area of the assembly.

OPERATION OF THE INVENTION

The apparatus of the present invention is adapted to be operated in a stop-start fashion enabling accurate and precise control over the feeding and bursting cycles. To this end the continuous form items are first fed from the supply bin into the burster per se after which the apparatus is stopped. The burster is then cycled severing the items along the line of weakening between items and again the apparatus is halted. Finally the burst item is ejected by the ejection rolls into a take-up hopper after which the machine is again stopped. This operation is adapted to be continued for as long as desired or until some stop signal is recognized by the apparatus abruptly halting the cycling.

Energization of the driving motors 16, 44, and 106 in timed sequence will cause the tractor mechanism first to feed the forms upwardly (leftwardly in FIG. 1) into the bursting area 38. Cam cluster 102 is rotated in the direction of the arrows shown in FIGS. 3 and 4, causing the lower foot rail assembly through the medium of the cam followers attached thereto to first move vertically, upwardly from the rest position of FIG. 5 into the position of FIG. 6 wherein it is seen that the deformable hold foot members 52 and 54 engage and stretch the two adjacent item forms therebetween due to the outward, separating movement of the opposite dumbbell-shaped end portions 52a and 54a away from one another in the direction of the arrows 126. It is noted that this gripping, separating, stretching action is localized and of sufficient magnitude to prevent movement of the forms by the ejection rollers 40 and 42 which are rapidly turning in opposite directions as indicated by arrows 128. The bottom roller 42 rotates continuously and skids. The top roller stops when the paper stops, merely applying pressure to the item during bursting. Continued rotation of the cam cluster 102 causes the penetrator cam 114 to move the penetrator 76 vertically, upwardly, forcing the upper irregular edge of the penetrator into the cutout portion 54b of the hold foot member 54, effectively forcing the web 54c thereof to arcuately "bow-out" or distend upwardly as seen in FIG. 7. This action forces its web against the lowermost one of the forms, compacting the forms to an extent exceeding the elastic limit thereof along the line of weakening, i.e., the perforations between individual forms, and effectively bursting the forms apart along such perforations as shown in FIG. 8. Continued rotation of the cam cluster retracts the lower hold foot assembly, freeing the form or form stock from between the two hold feet 52 and 54, simultaneously enabling the ejection rolls 40 and 42 to eject the nonburst form out of the bursting area at extremely high speed (leftwardly in FIGS. 5 through 8) into the receiving hopper or bin 50 for further handling. This intermittent stop-start operation continues at extremely high speed for as long as the motors may be energized and forms are desired to be separated.

In FIG. 9 is shown a further improved and preferred embodiment of the apparatus hereinbefore described. The construction of FIG. 9 is for the most part substantially indentical to that of the apparatus previously described with respect to FIGS. 1 through 8, inclusive, of the drawings. A notable exception is that in the construction illustrated in FIG. 9 no penetrator member is employed. The bursting is accomplished solely by means of the two deformable hold foot members 52 and 54. The operation of the apparatus is otherwise the same as that heretofore described. The construction illustrated in FIG. 9 benefits from a decrease in the mass of the apparatus brought about as a result of the complete removal of the penetrator assembly as well as the penetrator cam from the cam cluster. There is thus afforded a substantial saving in both cost of hardware as well as a saving in weight through the reduction in mass. Additionally, the mechanism is rendered more effective and efficient since without the stress raising lobes 98 on the penetrator more drive power is available.

FIG. 10 depicts a still further and improved modification of the embodiment of the apparatus described and illustrated in FIG. 9. It is noted that most, if not all, continuous forms presently in use whether fan-folded, rolled, or stacked are provided with transverse lines of weakening, e.g., perforations, etc., providing means for physically separating such forms into individual items or item assemblies. In the embodiment shown in FIG. 10 advantage is taken of the fact that once this weakened portion is broken, however slightly, this rupture or tear, thus started, is inclined to continue along the line of weakening with very little additional effort required whether by hand or by machine. By offsetting the foot rail cams of cam set 102 (or eccentric, if used) so that the rotation of one set of cams 112 slightly leads or lags the other set of cams 112, the lower foot rail and thus the hold foot secured thereto is caused to be angled slightly upwardly from the horizontal as seen most clearly in FIG. 10. In this regard, note that on the right side of this drawing the two hold feet 52 and 54 are closer together than they are on the left side in this particular figure. In operation of the device as the two hold feet are brought together by virtue of rotative motion of the cam cluster 102, the burst starts, for example, at the right edge of the form; and as the cams continue their rotation, the hold feet are caused to grip and stretch the forms, forcing the burst to continue in a leftward direction until the entire line of weakening has been ruptured or separated.

So as to prevent slewing of the burst item after the full burst has been accomplished, the ejection rolls on one side are caused to rotate at a differential rate (as by camming or changing the speed) from those of the other side, effectively compensating for the skewed condition of the item due to the burst being started at one edge rather than completely bursting straight across the item. The end result is a clean, quicker, and more efficient burst operation than heretofore has been possible.

The present invention contemplates a number of additional and different, albeit no less useful and efficiently operable, structural combinations, each slightly different from the other but each including the basic concepts of the invention as illustrated, described, and claimed herein.

Figure 11:
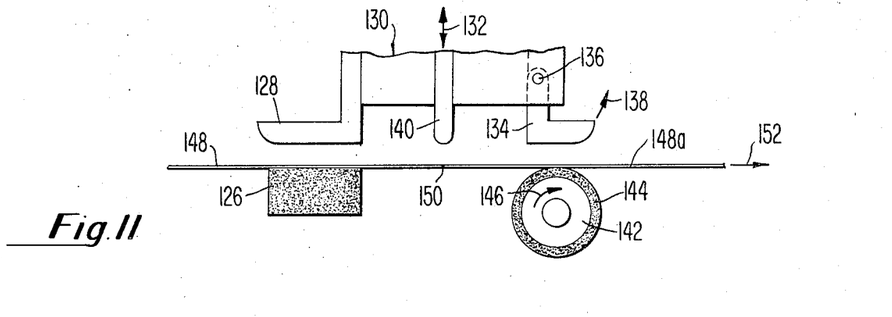

For example, FIG. 11 illustrates an arrangement in accordance with the invention wherein a lower hold foot member 126 of resilient material such, for example, as polyurethane or rubber, etc., is disposed adjacent to an upper hold foot member 128 of relatively rigid material, e.g., aluminum. The upper hold foot member 128 is carried by a mounting or supporting structural member 130 which is capble of and is operably disposed so as to be movable vertically, upwardly and downwardly in the direction of the double headed arrow 132. Mounted at the opposite end of the supporting member 130 is a kicker member 134 arcuately movable about a pivot point 136 in the direction of the arrow 138. Arranged between the upper hold foot member and the kicker member and reciprocably movable up and down therewith is an elongated penetrator 140 depending from the supporting assembly as shown. A rotatable item ejector wheel 142 carrying a resilient rim or tire 144 is mounted for rotation in the direction of the arrow 146 adjacent to the kicker 134. Continuous item forms 148 to be separated (provided with lines of weakening, e.g., perforations 150) are fed along a pathway extending between the upper and lower hold foot members, and the kicker and the resilient rotatable member in the direction of arrow 152. Stop-start energization of the apparatus, e.g., by means of cams or eccentric linkage, including the upper mounting assembly 130 and the lower rotatable wheel, causes the upper assembly to move downwardly toward the item 148, gripping the latter between the two hold feet 126 and 128 while the kicker foot, in conjunction with the drive wheel 142, the latter being rotatable as aforedescribed in the direction of the arrow 146, stretches the item therebetween. Continued movement of the supporting assembly 130 drives the downwardly projecting end of the penetrator member 140 into contact with the item along the line of weakening 150, causing the item to burst or separate at this perforation point, permitting the rightmost item 148a to be ejected at relatively high speed rightwardly beyond the kicker and drive wheel assembly.

Figure 12:
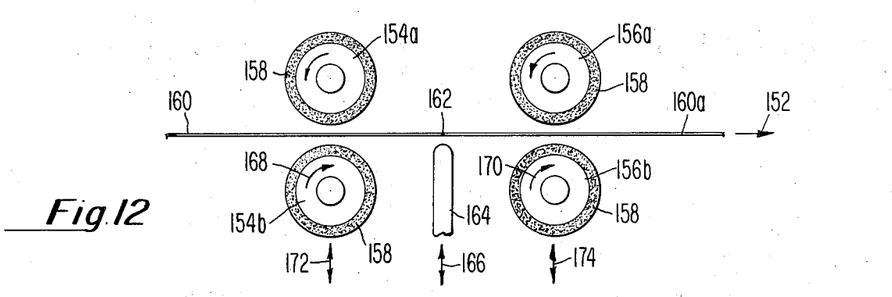

In FIG. 12 is shown an arrangement wherein two oppositely disposed sets or pairs of rotatable rollers 154a and 154b and 156a and 156b carrying resilient rims 158 are disposed so as to straddle the pathway through which continuous item forms 160, perforated as at 162, are arranged to be driven or moved, e.g., as by paper drive tractors. The rollers of the leftward pair are arranged to rotate at a different speed—slightly slower—than the speed of rotation of the rightward roller set. A penetrator 164 located adjacent to and beneath the pathway of the items is adapted to be moved vertically, upwardly, and downwardly in the direction of the double headed arrow 166 by means of associated mechanism not shown. The lowermost roller 154b and 156b of each set of rollers, while turning in the same direction as shown by their respective arrows 168 and 170, are arranged fro vertical, upward and downward movement in the direction of the double headed arrows 172 and 174.

In operation, when the lower set of rollers is driven upwardly by means not shown so as to contact and grip the paper item therebetween, the differential rotational speed of the two sets of rollers stretches the item therebetween. Movements of the penetrator 164 into engagement with the item along the line of perforations 162 causes the rightmost item 160a to burst away from the left item and to be ejected rightwardly (arrow 152) away from the right hand set of rollers.

In another variation of the foregoing construction the first roller set 154a and 154b is arranged to rotate in a direction opposite to the direction of movement of the items 160. This latter movement is controlled so as to be of extremely short duration so as to avoid item jams within the item pathway. In this manner the items are caused to be stretched between the first now stationary rollers 154a and 154b and the right hand roller set 156a and 156b, the latter turning at their normal rate. Thereafter movement of the penetrator into contact with the item at the line of perforations snaps the leading and trailing items apart. The leading item is quickly thereafter ejected rigtwardly as before.

Figure 13:
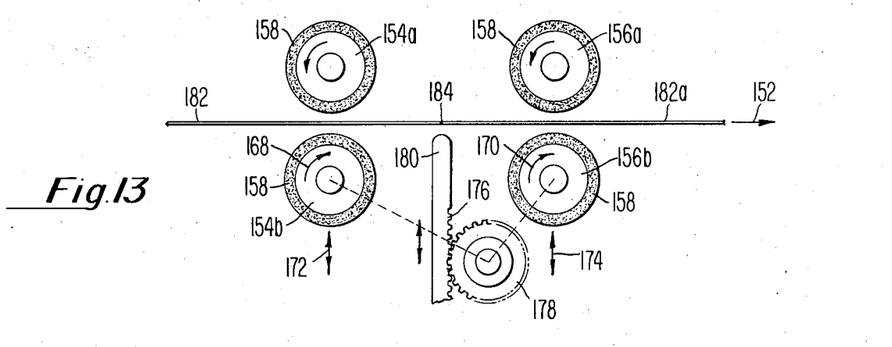

The apparatus illustrated in FIG. 13 is further exemplification of the concept described with respect to FIG. 12 but differs slightly therefrom. Rack teeth 176 are provided on penetrator 180 engagable with pinion means 178 for driving the penetrator member 180 vertically, upwardly, and downwardly (arrow 186) into contact with the item 182 at the line of weakening 184. Pinion gear 178 is arranged to be operably, controllably engageable with lower rollers 154b and 156b in such manner that the rollers and the penetrator move together in the upward direction but so that the lower rollers rotate for a short period of time oppositely from one another. Thus in operation the rising penetrator 180 by virtue of its concurrent movement with the lower rollers causes the item to be gripped and stretched by the reverse turning rollers. As soon as the penetrator has moved vertically a sufficient distance to cause the item to be burst, the penetrator is moved downwardly. This motion due to the interlocking arrangement of gearing disengages the left hand lower roller 154 and likewise disengages the right hand roller from the penetrator mechanism while permitting the latter roller in conjunction with upper roller 156a to rapidly eject the burst item in the direction of arrow 152.

Figure 14:
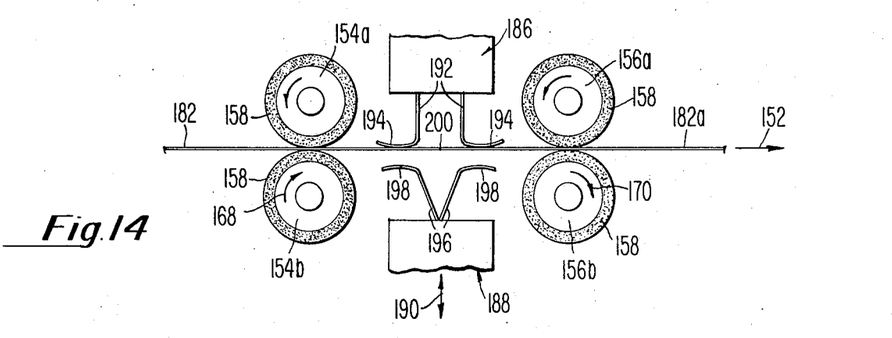

An arrangement is illustrated in FIG. 14 wherein the bursting mechanism comprises an upper hold foot member 186 which is fixed with respect to a lower movable hold foot member 188. Lower member 188 is movable vertically up and down in the direction of the double headed arrow 190. The upper hold member 186 carries two resilient members or tines 192 arranged to depend therefrom as shown and having their outermost extremities 194-194 slightly, arcuately bent in opposite directions away from the center of the hold foot member 186. The lower hold foot member 188 is provided with a triangularly shaped resilient member 196 having two oppositely projecting elements or tines 198-198 thereon, the end portion of each of which is arcuately curved and shaped as shown.

In operation with the two sets of contacting rollers 154a and 154b and 156a and 156b in motion in the direction of arrows 168 and 170 the item 182 is gripped and stretched therebetween. Vertical, upward movement of the lower hold foot member 188 causes the tines 198-198 of the V-shaped resilient element 196 to contact the depending elements 194-194 of the upper hold foot member 186, forcing the tines 198-198 to spread apart on contact with the item. The item is thus forced against the elements 194-194 of the upper hold foot member 186, stretching the item therebetween and causing the item to burst apart along the line of weakening 200. The rightmost item 182a is immediately ejected rightwardly in the direction of arrow 152.

While a particular embodiment of the invention has been shown, it will be understood, of course that it is not desired that the invention be limited thereto since modifications may be made, and it is, therefore, contemplated by the appended claims to cover any such modifications as fall within the true spirit and scope of the invention.

What is claimed is:

1. Apparatus for separating at preweakened zones therein single-or multi-part item webs comprising:
    means capable of being laterally and vertically extensible in the path of said web for tensioning said web in the area of said preweakened zone, and
    means operably associated with said tensioning means and displaceable relative to said tensioning means to an extent causing said web to exceed its elastic limit thereby bursting the same at said preweakened zone.

2. The invention according to claim 1 wherein said tensioning means comprises elongate, confronting members disposed normal to said item path.

3. Apparatus for separating continuous multiple items into separate and individual items comprising:
    oppositely disposed, relatively rigid, yet substantially deformable members;
    means providing relative movement between said deformable members;
    means causing said items to pass between said oppositely disposed members so that said members grip and stretch said items; and
    means operably engageable with said deformable members to cause said items to exceed their elastic limit effectively bursting the leading from the trailing edge.

4. The invention in accordance with claim 3 wherein said deformable members comprise elongated bodies of resilient plastic material shaped so that upon confronting contact with an item disposed therebetween said item is gripped and then stretched to exceed its elastic limit snapping the items apart.

5. Apparatus for separating continuous multiple items into separate and individual items comprising:
    oppositely disposed, relatively rigid, yet substantially deformable members;
    means providing relative movement between said deformable members;
    means moving said items between said oppositely disposed members whereby said members are caused to grip and stretch said items,
    and means operably engageable with said deformable members effective to further stretch said items while gripped by said deformable members thereby exceeding the elastic limit of said items and effectively bursting said items apart.

6. The invention in accordance with claim 5 wherein said means engageable with said deformable members comprises an elongate rigid member movable into contact with one of said deformable members and causing said latter member to distend beyond the horizontal plane of said item, bursting said items apart.

7. Apparatus for separating multiple continuous items into separate and individual plies comprising:
    oppositely disposed, relatively rigid, yet substantially deformable members;
    means providing relative movement between said deformable members;
    means causing said items to pass between said oppositely disposed members so that movement of said members together causes said items to be gripped and stretched, and;
    means operably associated with and operable in timed relation to movement of said deformable members causing said items to be further stretched exceeding the elastic limit thereof and effectively bursting said items apart.

8. The invention in accordance with claim 7 wherein said last means comprises a rigid member disposed normal to the plane of said items and provided with an irregular surface portion engageable with one said deformable member to distend the latter beyond the plane of the item bursting adjacent items apart.

9. Apparatus for severing multiple continuous item forms, one from another, at high speed along preweakened areas therein, permitting said forms to be stacked in a prearranged order comprising:

means into and through which said forms are adapted to be fed, said means including oppositely disposed, resilient, deformable members having confronting facing portions constrained by integral web portions, said deformable members being adapted to be reciprocably moved toward and away from one another whereby when said deformable members are in surface contact with each other said forms are stretched therebetween to an extent sufficient to cause said forms to burst apart and separate along said preweakened areas.

10. The invention in accordance with claim 9 wherein said deformable members extend normal and transverse to the path of movement of said items and each such member includes oppositely curved radial portions of material capable when said members are brought into surface contact of spreading apart laterally to an extent that the items gripped thereby are stretched sufficiently to be snapped apart along the line of weakening therebetween.

11. Apparatus for severing multiple continuous item forms, one from another, at high speed along preweakened areas therein, permitting said forms to be stacked in a prearranged order comprising:

means into and through which said forms are adapted to be fed, said means including oppositely disposed resilient, deformable members having confronting facing portions constrained by integral arcuate web portions, said deformable members being adapted to be moved toward and away from one another whereby when said deformable members are in surface contact with each other the web portions are flattened so that said forms are stretched therebetween to an extent sufficient to cause said forms to burst apart and separate along said preweakened areas.

12. The invention in accordance with claim 11 wherein said deformable members each include a longitudinal outout extending from end to end thereof and providing an interconnecting web extending between oppositely curved radial portions and further including means for limiting the distention of said members when in bursting engagement with said items.

13. Apparatus for completely severing multiple continuous item forms, one from another, at high speed along preweakened areas therein, permitting said forms to be stacked in a prearranged order comprising:

means into and through which said forms are adapted to be fed, said means including oppositely disposed resilient, deformable members having confronting facing portions constrained by integral arcuate web portions, said deformable members being adapted to be reciprocally moved toward and away from one another whereby when said deformable members are in surface contact with each other the web portions are flattened so that said forms are stretched therebetween, and means engageable with said web portion to distort the same to an extent sufficient to cause said forms to exceed their elastic limit thus to burst apart and separate along said preweakened areas.

14. The invention in accordance with claim 13 wherein said deformable members are angularly disposed relative to each other whereby the bursting action is started at one edge of the item and continues thereacross as the deformable members engage each other.

15. The invention in accordance with claim 13 wherein said deformable member includes a first pair of parallel tine-like elements operably associated with an oppositely disposed V-shaped tine-like element, each of said elements having arcuately curved end portions and capable when brought into engagement of being deflected and laterally spread apart so that the items fed therebetween are gripped and stretched and effectively burst apart.

16. The invention in accordance with claim 13 further including cam means operably associated with said deformable members and being angularly offset relative to each other whereby to cause said deformable members to grip, stretch and burst said item forms along a line of weakening provided therebetween.

17. Apparatus for separating multiple items into separate and individual items or sets of items comprising;

oppositely disposed, relatively rigid, yet substantially deformable and displaceable members, of relatively thin metallic material angularly displaced relative to each other such that when brought into confronting engagement they tend to spread apart laterally to grip and stretch items therebetween;

means providing relative movement between said deformable members; and means causing said items to pass between said oppositely disposed members whereby movement of the members into confronting contact causes the items to be gripped and stretched therebetween effectively bursting said items apart.

* * * * *